(12) United States Patent
Kagami et al.

(10) Patent No.: US 7,542,245 B2
(45) Date of Patent: Jun. 2, 2009

(54) COMPOSITE THIN-FILM MAGNETIC HEAD WITH NON-MAGNETIC CONDUCTIVE LAYER TO BALANCE PARASITIC CAPACITANCES

(75) Inventors: Takeo Kagami, Tokyo (JP); Noriaki Kasahara, Tokyo (JP); Tetsuya Kuwashima, Tokyo (JP)

(73) Assignee: TDK Corporation, Tokyo (JP)

( * ) Notice: Subject to any disclaimer, the term of this patent is extended or adjusted under 35 U.S.C. 154(b) by 543 days.

(21) Appl. No.: 11/348,487

(22) Filed: Feb. 7, 2006

(65) Prior Publication Data

US 2006/0176618 A1    Aug. 10, 2006

(30) Foreign Application Priority Data

Feb. 10, 2005    (JP)    ............... 2005-034280

(51) Int. Cl.
*G11B 5/265*    (2006.01)
*G11B 5/31*    (2006.01)
*G11B 5/39*    (2006.01)

(52) U.S. Cl. ............. 360/317; 360/319; 360/324.2

(58) Field of Classification Search ......... 360/317, 360/319, 324.2
See application file for complete search history.

(56) References Cited

U.S. PATENT DOCUMENTS 6,181,537 B1 *    1/2001    Gill ................. 360/324.2

2002/0149887 A1*    10/2002    Sato ............... 360/319
2006/0044701 A1*    3/2006    Funayama ............ 360/322

FOREIGN PATENT DOCUMENTS

JP    2001-236614    8/2001

OTHER PUBLICATIONS

Klaas B. Klaassen et al. "*Write-to-Read Coupling.*" IEEE Transactions on Magnetics. vol. 38, No. 1. pp. 61-67. Jan. 2002.

* cited by examiner

*Primary Examiner*—Craig A Renner
(74) *Attorney, Agent, or Firm*—Frommer Lawrence & Haug LLP

(57) ABSTRACT

Composite thin-film magnetic head includes a substrate; a first insulation layer on the substrate; an MR read head element on the first insulation layer and provided with a lower shield layer, an upper shield layer and an MR layer with a sense current flowing perpendicular to a surface of the MR layer though the upper and lower shield layers; a second insulation layer on the MR read head element; an inductive write head element on the second insulation layer and provided with a lower magnetic pole layer, a recording gap layer, an upper magnetic pole layer with end portion opposed to an end portion of the lower magnetic pole layer through the recording gap layer and a write coil; and a nonmagnetic conductive layer electrically conducted with the lower shield layer and opposed to the substrate to increase the electrode area between the lower shield layer and the substrate.

10 Claims, 8 Drawing Sheets

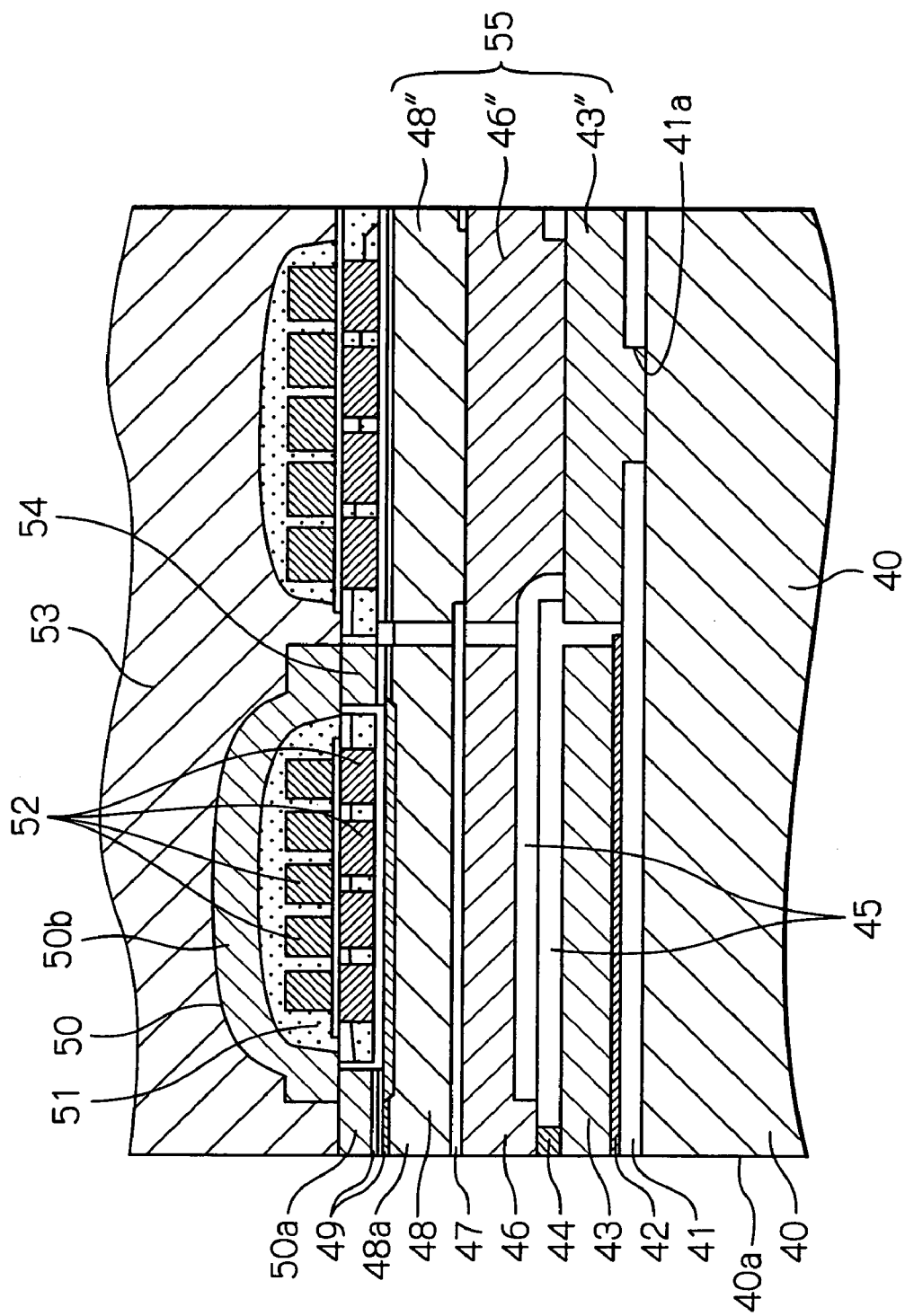

COMPOSITE THIN-FILM MAGNETIC HEAD WITH NON-MAGNETIC CONDUCTIVE LAYER TO BALANCE PARASITIC CAPACITANCES

PRIORITY CLAIM

This application claims priority from Japanese patent application No. 2005-034280, filed on Feb. 10, 2005, which is incorporated herein by reference.

BACKGROUND OF THE INVENTION

1. Field of the Invention

The present invention relates to a composite thin-film magnetic head provided with an inductive write head element and a magnetoresistive effect (MR) read head element having a current perpendicular to plane (CPP) structure that passes a sense current in a direction perpendicular to surfaces of laminated layers, to a magnetic head assembly, and to a magnetic disk drive apparatus.

2. Description of the Related Art

Recently, in order to satisfy the demand for higher recording density and downsizing in a hard disk drive (HDD) apparatus, higher sensitivity and larger output of a thin-film magnetic head is required. Thus, improvement in performance of a general giant magnetoresistive effect (GMR) head with a GMR read head element is now strenuously proceeding, and also development of a tunnel magnetoresistive effect (TMR) head with a TMR read head element that can provide a double resistance change ratio or more with respect to the GMR head element is energetically performed.

Because of the difference in flowing directions of the sense currents, structures of these TMR head and general GMR head differ from each other. One head structure in which the sense current flows in a direction parallel with surfaces of laminated layers as in the general GMR head is called as a current in plane (CIP) structure, whereas the other head structure in which the sense current flows in a direction perpendicular to surfaces of laminated layers as in the TMR head is called as a CPP structure. In recent years, CPP-GMR heads not CIP-GMR heads are being developed.

Because the CPP structure utilizes magnetic shield layers themselves as electrodes, short-circuit or insufficient insulation between magnetic shield layers and element layer, which had been serious problem for narrowing the read gap in the CIP structure never inherently occurs. Therefore, the CPP structure lends itself to a high recording density head.

In recent, studied are CPP-GMR heads with spin valve magnetic multi-layered films including such as dual-spin valve type magnetic multi-layered films as in the case of the CIP-GMR heads.

The more miniaturization of the HDD apparatus with such composite thin-film magnetic head, however, causes a problem of crosstalk between a writing side and a reading side. Especially, more miniaturization of a magnetic head element causes an increase in density of a current flowing through the element due to a decrease in a cross section area of the element, as well as a decrease in thermal dissipation. Moreover, higher frequency for writing results in a steep change in voltage applied to the write head element. Consequently, a crosstalk occurs from the writing side to the reading side.

A technique to reduce a crosstalk between trace conductors in the writing side and in the reading side is proposed in Klaas B. Klaassen et al., "Write-to-Read Coupling", IEEE Trans. Magn. Vol. 38, pp 61-67, January 2002, which analyzes a coupling mechanism between the trace conductors formed oh a suspension. In the description, it is concluded that almost all crosstalk is caused by the coupling between the trace conductors, not by the inner coupling in the magnetic head.

The inventors of the present invention however thought that the inner coupling must have a great influence on the crosstalk between the writing and reading sides as well as the coupling between the trace conductors, and achieved analyses and investigations with respect to the crosstalk.

As a consequence of the analyses and investigations, it is appeared that parasitic capacitances between layers of the inductive write head element and the MR read head element of the composite thin-film magnetic head exerts an influence upon occurrence of the crosstalk. Particularly, in the composite thin-film magnetic head with the CPP structure read head element, because the lower and upper shield layers are used as electrodes of the read head element and thus a parasitic capacitance between the upper shield layer and the write coil becomes certainly larger than that between the lower shield layer and the write coil, a crosstalk voltage is produced across the read head element.

If the crosstalk voltage is produced, in the CPP-GMR read head element, a decrease in operating life of the read head element due to an enhancement of electromigration and a degradation of magnetic properties due to an enhancement of an interlayer diffusion of metal atoms may occur. Also, in the TMR read head element, if the crosstalk voltage is produced, the reading performance may be greatly degraded due to the decrease in the electrical resistance of the element caused by the formation of the pinholes in the barrier layer.

Furthermore, in the CPP-GMR read head element, because a considerable amount of noises entered in the substrate appear in the lower shield layer side electrode near the substrate, the difference between the noise in the lower shield layer side electrode and the noise in the upper shield layer side electrode is amplified at the preamplifier and then the amplified difference is superimposed on the reproduced signal. Therefore, the read head element with the CPP structure is vulnerable to external noises.

In order to reduce not only the crosstalk between the CPP-structure MR read head element and the write head element but also influence of the external noises, the assignee of the present invention proposed in U.S. Pat. No. 7,436,633 a composite thin-film magnetic head configured such that a parasitic capacitance C4 between the substrate and the lower shield layer of the read head element is substantially equal to a parasitic capacitance C2 between the upper shield layer of the read head element and the lower magnetic pole layer of the write head element and that the substrate and the lower magnetic pole layer are at the same potential.

However, it is difficult to adjust the parasitic capacitances C4 and C2 to become equal to each other. This is because change in the thickness of the insulation layer between the substrate and the lower shield layer and also change in the thickness of the insulation layer between the upper shield layer and the lower magnetic pole layer are limited and also because the shape and size of the lower shield layer, the upper shield layer and the lower magnetic pole layer are limited to change.

More concretely, the thickness of the insulation layer between the substrate and the lower shield layer and also the thickness of the insulation layer between the upper shield layer and the lower magnetic pole layer cannot be increased from predetermined necessary values to keep good thermal dissipation efficiency for suppressing the thermal expansion of the magnetic pole layers due to produced heat during the write operations. Rather, in order to decrease the manufacturing time so as to achieve the economics of mass production, it is desired to form these insulation layers as thin as possible. Contrary to this, in order to prevent electrical breakdown due to charging up, these insulation layers should not be formed too thin. Therefore, it is quite difficult to adjust the parasitic capacitances C4 and/or C2 by controlling the thicknesses of these insulation layers.

Also, it is difficult to freely change the thickness, shape and size of the lower shield layer, the upper shield layer and the lower magnetic pole layer because they exert influence upon the external magnetic field resistance, upon the shield magnetic domain performance due to write stress, and upon the reading/writing characteristics. Therefore, it is extremely difficult to adjust the parasitic capacitances C4 and/or C2 by controlling these thickness, shape and size.

SUMMARY OF THE INVENTION

It is therefore an object of the present invention to provide a composite thin-film magnetic head provided with an MR read head element having CPP structure, a magnetic head assembly and a magnetic disk drive apparatus, whereby parasitic capacitances C4 and/or C2 can be adjusted without changing a thickness of an insulation layer between a substrate and a lower shield layer, a thickness of an insulation layer between an upper shield layer and a lower magnetic pole layer, and also a thickness, a shape and a size of the lower shield layer, the upper shield layer and the lower magnetic pole layer.

According to the present invention, a composite thin-film magnetic head includes a substrate; a first insulation layer laminated on the substrate; an MR read head element formed on the first insulation layer and provided with a lower shield layer, an upper shield layer and an MR layer in which a sense current flows in a direction perpendicular to a surface of the MR layer through the upper shield layer and the lower shield layer; a second insulation layer laminated on the MR read head element; an inductive write head element formed on the second insulation layer and provided with a lower magnetic pole layer, a recording gap layer, an upper magnetic pole layer whose end portion is opposed to an end portion of the lower magnetic pole layer through the recording gap layer and a write coil; and a nonmagnetic conductive layer electrically conducted with the lower shield layer and opposed to the substrate in order to increase substantially countered area between the lower shield layer and the substrate.

The nonmagnetic conductive layer conducted to the lower shield layer is added to counter with the substrate so as to increase the substantial counter electrode area between the lower shield layer and the substrate. By increasing the substantial counter electrode area between the lower shield layer and the substrate, the parasitic capacitance C4 between the lower shield layer and the substrate is increased. Therefore, it is possible to easily adjust the parasitic capacitance C4 so as to be equal to the parasitic capacitance C2. Further, because the added conductive layer is nonmagnetic and no change in the thickness, shape and size of the of the lower shield layer, the upper shield layer and the lower magnetic pole layer is necessary, the external magnetic field resistance, the shield magnetic domain performance due to write stress and the reading/writing characteristics of the thin-film magnetic head can be maintained without change.

It is most preferred that the nonmagnetic conductive layer is laminated on a substrate-side surface of the lower shield layer. Because the nonmagnetic conductive layer is laminated on the substrate-side surface of the lower shield layer, a distance between the nonmagnetic conductive layer and the substrate is not increased to effectively increase the parasitic capacitance C4.

It is preferred that the nonmagnetic conductive layer is laminated on a surface of the lower shield layer, which surface is opposite to a substrate-side surface of the lower shield layer. If the lower shield layer is thin, a distance between the nonmagnetic conductive layer and the substrate is not increased so as to effectively increase the parasitic capacitance C4.

It is also preferred that a thickness of the second insulation layer is thinner than that of the first insulation layer. The first insulation layer is laminated on the substrate with a poor surface flatness, whereas the second insulation layer is laminated on the upper shield layer with an improved good surface flatness due to the chemical mechanical polishing (CMP). Thus, it is possible to make the second insulation layer thinner than the first insulation layer to improve heat dissipation performance and reduce the manufacturing cost. Although thinning of the second insulation layer invites increasing of the parasitic capacitance C2, this can be solved by increasing the parasitic capacitance C4 according to the present invention.

According to the present invention, also, a composite thin-film magnetic head includes a substrate; a first insulation layer laminated on the substrate; an MR read head element formed on the first insulation layer and provided with a lower shield layer, an upper shield layer and an MR layer in which a sense current flows in a direction perpendicular to a surface of the MR layer through the upper shield layer and the lower shield layer; a second insulation layer laminated on the MR read head element; an inductive write head element formed on the second insulation layer and provided with a lower magnetic pole layer, a recording gap layer, an upper magnetic pole layer whose end portion is opposed to an end portion of the lower magnetic pole layer through the recording gap layer and a write coil; and a nonmagnetic conductive layer electrically conducted with the upper shield layer and opposed to the lower magnetic pole layer in order to increase substantially countered area between the upper shield layer and the lower magnetic pole layer.

The nonmagnetic conductive layer conducted to the upper shield layer is added to counter with the lower magnetic pole layer so as to increase the substantial counter electrode area between the upper shield layer and the lower magnetic pole layer. By increasing the substantial counter electrode area between the upper shield layer and the lower magnetic pole layer, the parasitic capacitance C2 between the upper shield layer and the lower magnetic pole layer is increased. Therefore, it is possible to easily adjust the parasitic capacitance C2 so as to be equal to the parasitic capacitance C4. Further, because the added conductive layer is nonmagnetic and no change in the thickness, shape and size of the of the lower shield layer, the upper shield layer and the lower magnetic pole layer is necessary, the external magnetic field resistance, the shield magnetic domain performance due to write stress and the reading/writing characteristics of the thin-film magnetic head can be maintained without change.

It is most preferred that the nonmagnetic conductive layer is laminated on a lower magnetic pole layer side surface of the upper shield layer. Because the nonmagnetic conductive layer is laminated on the lower magnetic pole layer side surface of the upper shield layer, a distance between the nonmagnetic conductive layer and the lower magnetic pole layer is not increased to effectively increase the parasitic capacitance C2.

It is preferred that the nonmagnetic conductive layer is laminated on a surface of the upper shield layer, which surface is opposite to a lower magnetic pole layer side surface of the upper shield layer. If the upper shield layer is thin, a distance between the nonmagnetic conductive layer and the lower magnetic pole layer is not increased so as to effectively increase the parasitic capacitance C2.

According to the present invention, furthermore, a composite thin-film magnetic head includes a substrate; a first insulation layer laminated on the substrate; an MR read head element formed on the first insulation layer and provided with a lower shield layer, an upper shield layer and an MR layer in which a sense current flows in a direction perpendicular to a surface of the MR layer through the upper shield layer and the lower shield layer; a second insulation layer laminated on the MR read head element; an inductive write head element formed on the second insulation layer and provided with a lower magnetic pole layer, a recording gap layer, an upper magnetic pole layer whose end portion is opposed to an end portion of the lower magnetic pole layer through the recording gap layer and a write coil; and a nonmagnetic conductive layer electrically conducted with the lower magnetic pole layer and opposed to the upper shield layer in order to increase substantially countered area between the upper shield layer and the lower magnetic pole layer.

The nonmagnetic conductive layer conducted to the lower magnetic pole layer is added to counter with the upper shield layer so as to increase the substantial counter electrode area between the lower magnetic pole layer and the upper shield layer. By increasing the substantial counter electrode area between the lower magnetic pole layer and the upper shield layer, the parasitic capacitance C2 between the lower magnetic pole layer and the upper shield layer is increased. Therefore, it is possible to easily adjust the parasitic capacitance C2 so as to be equal to the parasitic capacitance C4. Further, because the added conductive layer is nonmagnetic and no change in the thickness, shape and size of the of the lower shield layer, the upper shield layer and the lower magnetic pole layer is necessary, the external magnetic field resistance, the shield magnetic domain performance due to write stress and the reading/writing characteristics of the thin-film magnetic head can be maintained without change.

It is most preferred that the nonmagnetic conductive layer is laminated on an upper shield layer side surface of the lower magnetic pole layer. Because the nonmagnetic conductive layer is laminated on the upper shield layer side surface of the lower magnetic pole layer, a distance between the nonmagnetic conductive layer and the upper shield layer is not increased to effectively increase the parasitic capacitance C2.

It is preferred that the nonmagnetic conductive layer is laminated on a surface of the lower magnetic pole layer, which surface is opposite to an upper shield layer side surface of the lower magnetic pole layer. If the lower magnetic pole layer is thin, a distance between the nonmagnetic conductive layer and the upper shield layer is not increased so as to effectively increase the parasitic capacitance C2.

It is also preferred that a parasitic capacitance C4 generated between the substrate and the lower shield layer is substantially equal to a parasitic capacitance C2 generated between the upper shield layer and the lower magnetic pole layer. In this case, preferably, an electrical resistance between the substrate and the lower magnetic pole layer is 100 Ω or less for example several Ω. Thus, the substrate and the lower magnetic pole layer becomes at substantially the same potential, and the potential difference between the lower electrode and the upper electrode of the MR read head element becomes substantially zero by adjusting the parasitic capacitance so that C4=C2. As a result, no crosstalk voltage is generated. As a result, any external noise entered into the thin-film magnetic head is never presented on the reproduced signal to prevent error due to the external noises from occurring, and thus reliability of the head is improved. Furthermore, in case of the TMR read head element, a reduction of the crosstalk voltage directly applied from the write head element to the read element can certainly prevent formation of pinholes in the barrier layer, which reduce the element resistance and deteriorate the reading characteristics. In case of the CPP-structure GMR read head element, a reduction of the crosstalk voltage directly applied from the write head element to the read head element can prevent a decrease in operating life of the read head element due to an enhancement of electromigration and can also prevent a degradation of magnetic properties due to an enhancement of an interlayer diffusion of metal atoms.

It is preferred that the MR read head element is a GMR read head element or a TMR read head element.

According to the present invention, furthermore, a magnetic head assembly includes the above-mentioned composite thin-film magnetic head and a support member for supporting the composite thin-film magnetic head. Here, the magnetic head assembly means an assembly mechanically and electrically assembling a composite thin-film magnetic head or a magnetic head slider having a write head element and a read head element with its support member. More concretely, an assembly of a magnetic head slider and a suspension is in general called as a head gimbal assembly (HGA), an assembly of a magnetic head slider, a suspension and a support arm for supporting the suspension is in general called as a head arm assembly (HAA), and an assembly stacking a plurality of HAAs is in general called as a head stack assembly (HSA).

According to the present invention, in addition, a magnetic disk drive apparatus includes at least one magnetic disk, at least one composite thin-film magnetic head mentioned above and at least one support member for supporting at least one composite thin-film magnetic head.

Further objects and advantages of the present invention will be apparent from the following description of the preferred embodiments of the invention as illustrated in the accompanying drawings.

BRIEF DESCRIPTION OF THE SEVERAL VIEWS OF THE DRAWINGS

FIG. 4 is a center sectional view schematically illustrating a configuration of the composite thin-film magnetic head shown in FIG. 3;

DESCRIPTION OF THE PREFERRED EMBODIMENTS

Figure 1:
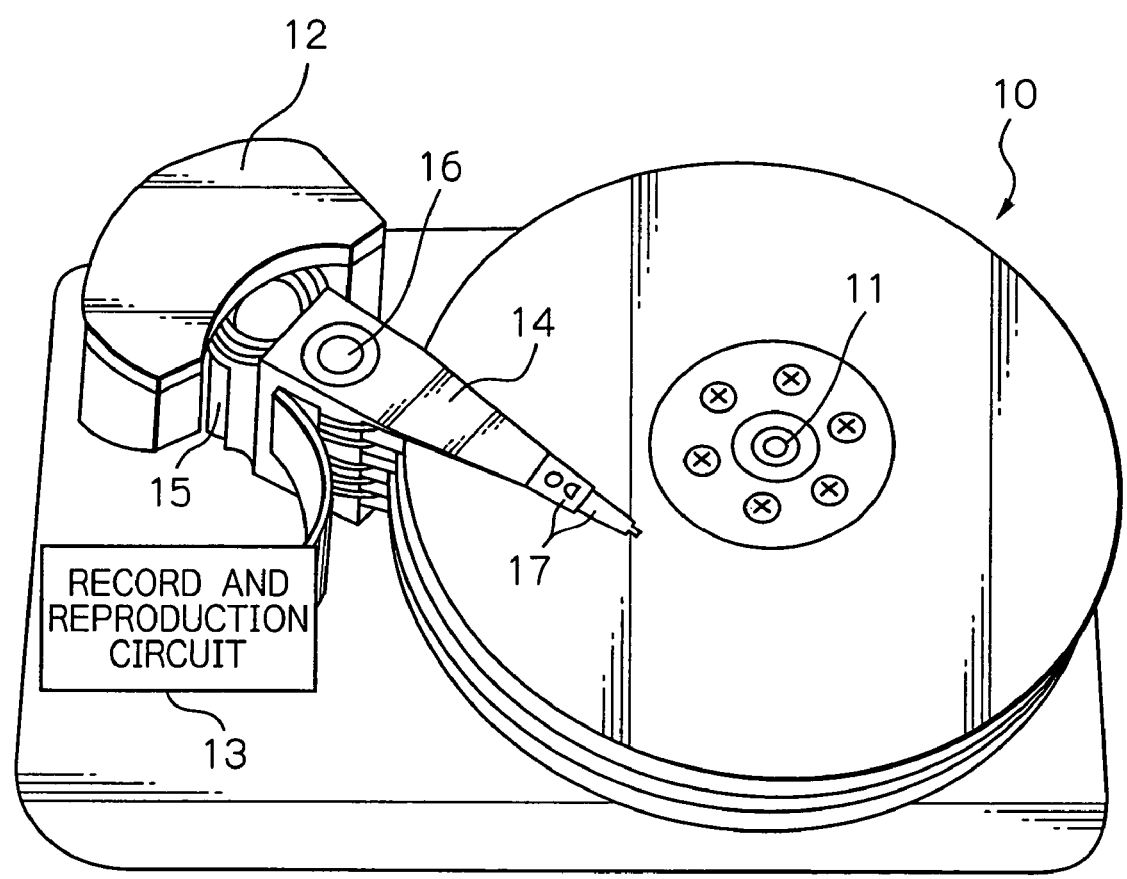
FIG. 1 is an oblique view schematically illustrating main components of a magnetic disk drive apparatus as a preferred embodiment of the present invention.
Figure 2:
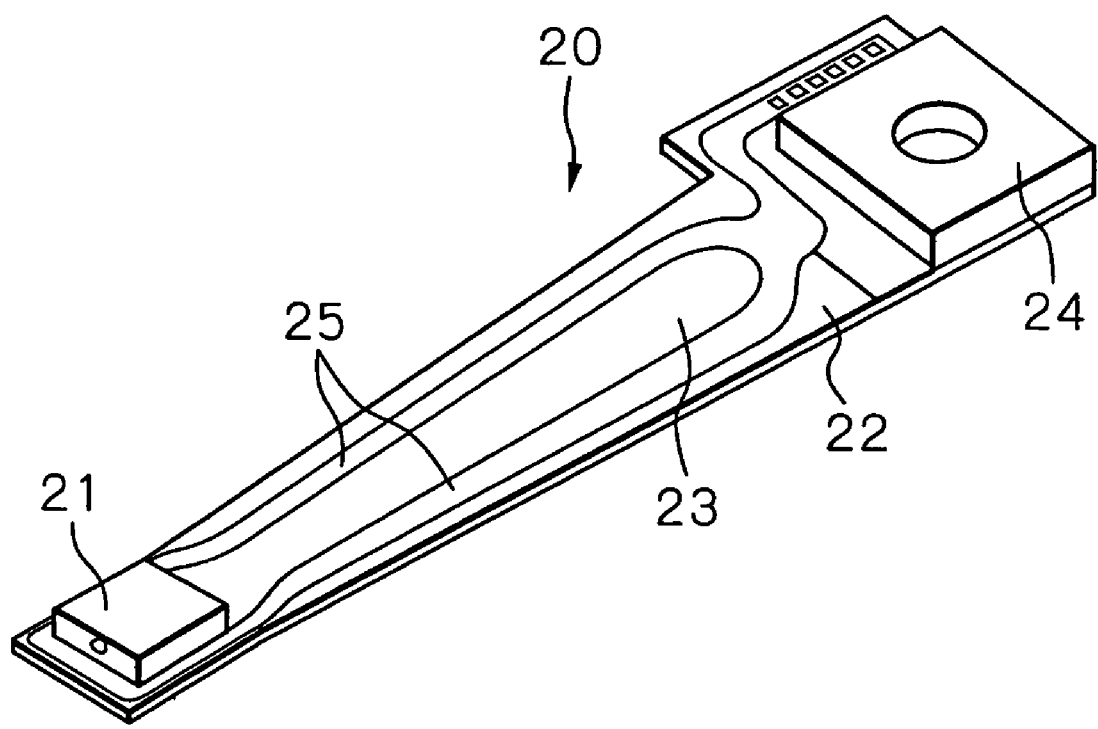
FIG. 2 is an oblique view illustrating a configuration example of an HGA in the embodiment of FIG. 1.
Figure 3:
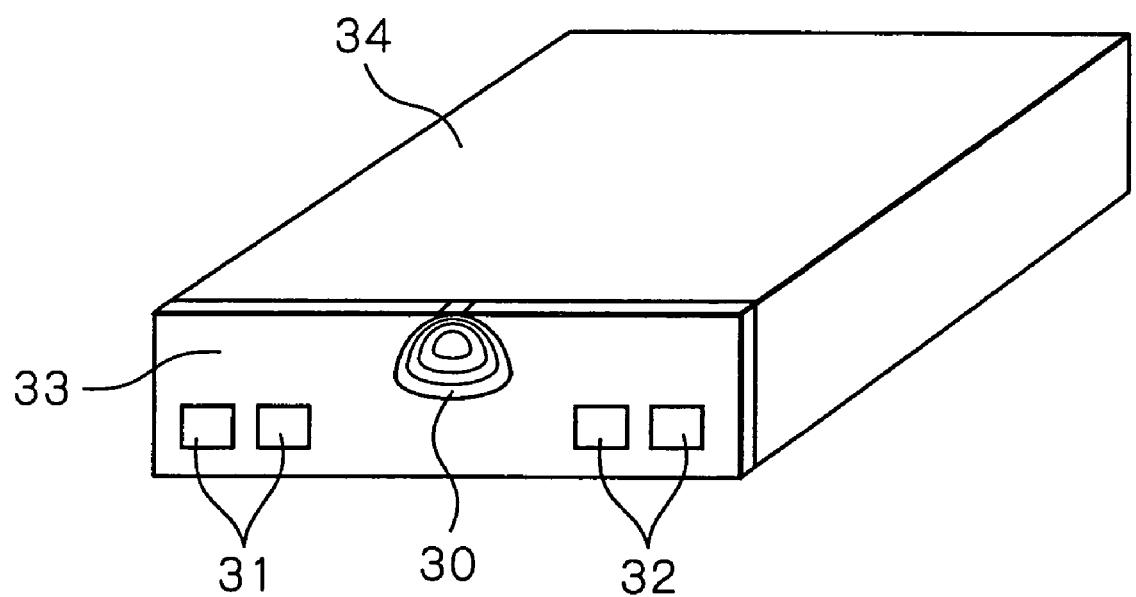
FIG. 3 is an oblique view illustrating a composite thin-film magnetic head mounted at a top end section of the HGA shown in FIG. 2.

FIG. 1 schematically illustrates main components of a magnetic disk drive apparatus as a preferred embodiment of the present invention, FIG. 2 illustrates a configuration example of an HGA in the embodiment of FIG. 1, and FIG. 3 illustrates a composite thin-film magnetic head mounted at a top end section of the HGA shown in FIG. 2.

In FIG. 1, reference numeral 10 denotes a plurality of magnetic hard disks rotating around a rotation axis of a spindle motor 11, 12 denotes an assembly carriage device for positioning each composite thin-film magnetic head or magnetic head slider on a track of each disk, and 13 denotes a read/write circuit for controlling read and write operations, respectively.

The assembly carriage device 12 has a plurality of drive arms 14 stacked along a pivot bearing axis 16. These drive arms 14 are capable of rotating around the axis 16 and driven by a voice coil motor (VCM) 15. An HGA 17 is mounted on a top section of each arm 14. Each HGA 17 has the composite thin-film magnetic head or the magnetic head slider 21 mounted at its top end section so that the slider opposes to a surface of each magnetic disk 10. In modifications, a single magnetic disk 10, a single drive arm 14 and a single HGA 17 may be provided.

As shown in FIG. 2, the HGA is assembled by fixing the composite thin-film magnetic head 21 having an inductive write head element and a CPP-structure MR read head element to a top end section of a suspension 20, and by electrically connecting one ends of trace conductors to terminal electrodes of the thin-film magnetic head 21.

The suspension 20 is substantially constituted by a load beam 22 for producing a load to be applied to the composite thin-film magnetic head 21, a resilient flexure 23 fixed on and supported by the load beam 22, a base plate 24 attached or formed at a base end section of the load beam 22, and a lead conductor member 25 fixed on the flexure 23 and the load beam 22 and provided with the trace conductors and connection pads electrically connected both ends of the trace conductors.

A structure of the suspension of the HGA that is the magnetic head assembly according to the present invention is not limited to the aforementioned structure. Furthermore, although it is not shown, a head drive IC chip may be mounted on a middle of the suspension 20.

As shown in FIG. 3, the thin-film magnetic head in this embodiment has, on its element-forming surface 33, a composite magnetic head element 30 consisting of an inductive write head element and an MR read head element laminated on each other, and four signal electrode terminals 31 and 32 electrically connected to these elements. In this figure, reference numeral 34 denotes an air bearing surface (ABS) of the magnetic head slider. The number and positions of the electrode terminals are not limited to these shown in FIG. 3.

FIG. 4 schematically illustrates a configuration of the composite thin-film magnetic head shown in FIG. 3.

An under layer 41, corresponding to a first insulation layer in the present invention, made of an insulating material such as for example $Al_2O_3$ or $SiO_2$ is laminated on a substrate or a slider substrate 40 made of a conductive material such as for example $Al_2O_3$—TiC (AlTiC).

A nonmagnetic conductive layer 42 made of a nonmagnetic conductive material such as for example Ti, Ta, Au, Ru or Cu is additionally laminated on the under layer 41 at a position near the ABS. On the nonmagnetic conductive layer 42, laminated is a lower shield layer (SF) 43 that also operates as a lower electrode layer and is made of a magnetic metal material such as for example FeAlSi, NiFe, CoFe, NiFeCo, FeN, FeZrN, FeTaN, CoZrNb or CoZrTa. The nonmagnetic conductive layer 42 and the lower shield layer 43 are electrically conducted to each other.

The lower shield layer 43 is in general opposed to the substrate 40 via the under layer 41, and therefore this lower shield layer 43 and the substrate 40 function as counter electrodes to generate a parasitic capacitance C4 there between. In this embodiment, because the nonmagnetic conductive layer 42 has a larger area than that of the lower shield layer 43 and the nonmagnetic conductive layer 42 is laminated on the substrate-side surface of the lower shield layer 43, the nonmagnetic conductive layer 42 and the substrate 40 function as counter electrodes to generate the parasitic capacitance C4.

Figure 5A:
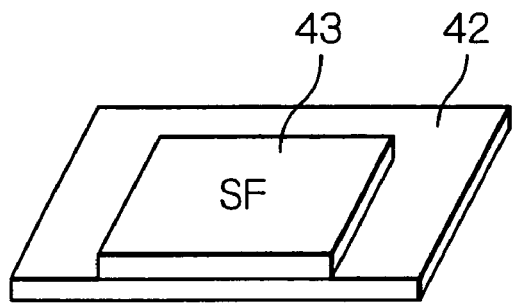
FIG. 5 is an oblique view illustrating a configuration example of a lower shield layer and a nonmagnetic conductive layer in the composite thin-film magnetic head shown in FIG. 3.

As shown in FIG. 5a, in this embodiment, the nonmagnetic conductive layer 42 has larger outer sizes than these of the lower shield layer 43, a substantial counter area of the lower shield layer 43 against the substrate 40, that is, an area of the counter electrodes to generate the parasitic capacitance C4 increases by additionally forming this nonmagnetic conductive layer 42. A thickness of the nonmagnetic conductive layer 42 is for example about 0.1 μm, whereas a thickness of the lower shield layer 43 is for example about 2 μm.

Figure 5B:
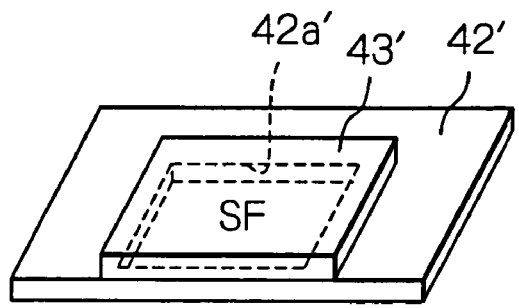

In modification, as shown in FIG. 5b, a nonmagnetic conductive layer 42' may have a through hole part 42a' and a lower shield layer 43' lays over the through hole part 42a'. As will be understood from this modification, even if the area of the nonmagnetic conductive layer 42' is smaller than that of the lower shield layer 43', when the outer sizes of the nonmagnetic conductive layer 42' are larger than these of the lower shield layer 43', a substantial counter area of the lower shield layer 43' against the substrate 40, that is, an area of the counter electrodes to generate the parasitic capacitance C4 may increase by additionally forming this nonmagnetic conductive layer 42'.

On the lower shield layer 43, an MR layer 44 with the CPP structure and an insulation layer 45 made of an insulating material such as for example $Al_2O_3$ or $SiO_2$ are laminated.

The CPP-structure MR layer 44 will be formed from, in case of a CPP-GMR layer, a multilayered structure including a free layer of a ferromagnetic material such as for example NiFe, CoFe or NiFeCo, a nonmagnetic layer of a nonmagnetic conductive material such as for example Cu, a pinned layer of a ferromagnetic material such as for example NiFe, CoFe or NiFeCo, and a pinning layer of an antiferromagnetic material such as for example PtMn, FeMn, MnIr, NiMn or CrMnPt. In case of a TMR layer, the CPP-structure MR layer 44 will be formed from a multilayered structure including a free layer of a ferromagnetic material such as for example NiFe, CoFe or NiFeCo, a thin barrier layer of an insulation material such as for example oxides of Ti, Ta, Al, Zr, Hf, Si, Mg or Zn, a pinned layer of a ferromagnetic material such as for example NiFe, CoFe or NiFeCo, and a pinning layer of an antiferromagnetic material such as for example PtMn, FeMn, MnIr, NiMn or CrMnPt. The multilayered structure of the CPP-structure MR layer 44 is not limited to the abovementioned structure but various layer configurations will be of course possible. Although not shown in the figures, the MR layer 44 may have a magnetic domain control layer and other necessary layers.

On the CPP-structure MR layer 44 and the insulation layer 45, laminated is an upper shield layer (SS1) 46 that also operates as an upper electrode layer and is made of a magnetic metal material such as for example FeAlSi, NiFe, CoFe, NiFeCo, FeN, FeZrN, FeTaN, CoZrNb or CoZrTa.

The CPP-structure MR read head element is mainly composed of the lower shield layer 43, the MR layer 44, the insulation layer 45, the upper shield layer 46, the magnetic domain control layer and a lead conductor layer not shown.

On the upper shield layer 46, a inter-shield insulation layer 47, corresponding to a second insulation layer in the present invention, made of an insulating material such as for example $Al_2O_3$ or $SiO_2$ is laminated. A lower magnetic pole layer (SS2) 48 made of a magnetic metal material such as for example FeAlSi, NiFe, CoFe, NiFeCo, FeN, FeZrN, FeTaN, CoZrNb or CoZrTa is laminated on the inter-shield insulation layer 47.

On the lower magnetic pole layer 48, a recording gap layer 49 made of a metal material such as for example Ru or an insulation material such as for example $SiO_2$ is laminated. An upper pole portion 50a of an upper magnetic pole layer 50 made of a magnetic metal material such as for example FeAlSi, NiFe, CoFe, NiFeCo, FeN, FeZrN, FeTaN, CoZrNb or CoZrTa and a write coil layer 52 made of a conductive material such as for example Cu, covered by an insulation layer 51 of an insulating material such as a resist are laminated on the recording gap layer 49. A lower pole portion 48a located at a top end section or an ABS-side end section of the lower magnetic pole layer 48 and the upper pole portion 50a located at a top end section or an ABS-side end section of the upper magnetic pole layer 50 are opposed to each other via the recording gap layer 49.

Although the write coil layer 52 in this embodiment is formed in a two-layered structure, it is apparent that this write coil layer 52 may be formed in a single-layered structure or other layered structure.

On the insulation layer 51 that covers the write coil layer 52, an upper yoke portion 50b of the upper magnetic pole layer 50 is formed. A protection layer 53 made of an insulating material such as for example $Al_2O_3$ is laminated on the upper pole portion 50a and the upper yoke portion 50b of the upper magnetic pole layer 50.

The inductive write head element is mainly composed of the lower magnetic pole layer 48, the recording gap layer 49, the upper magnetic pole layer 50, the insulation layer 51 and the write coil layer 52.

The insulation layer 51 and the write coil layer 52 are also formed in the rear region or anti ABS-side region of a back gap section 54 that magnetically connects the lower magnetic pole layer 48 and the upper magnetic pole layer 50 with each other.

In this rear region, a heatsink 55 for dissipating heat generated in the head to the substrate is formed. This heatsink 55 is formed as a multilayered structure of layers 43'', 46'' and 48'' separated from the lower shield layer 43, the upper shield layer 46 and the lower magnetic pole layer 48 but kept in contact with one another. The bottom of the heatsink 55 is made contact with the substrate 40 via a through hole 41a formed by partially removing the under layer 41.

Figure 6:
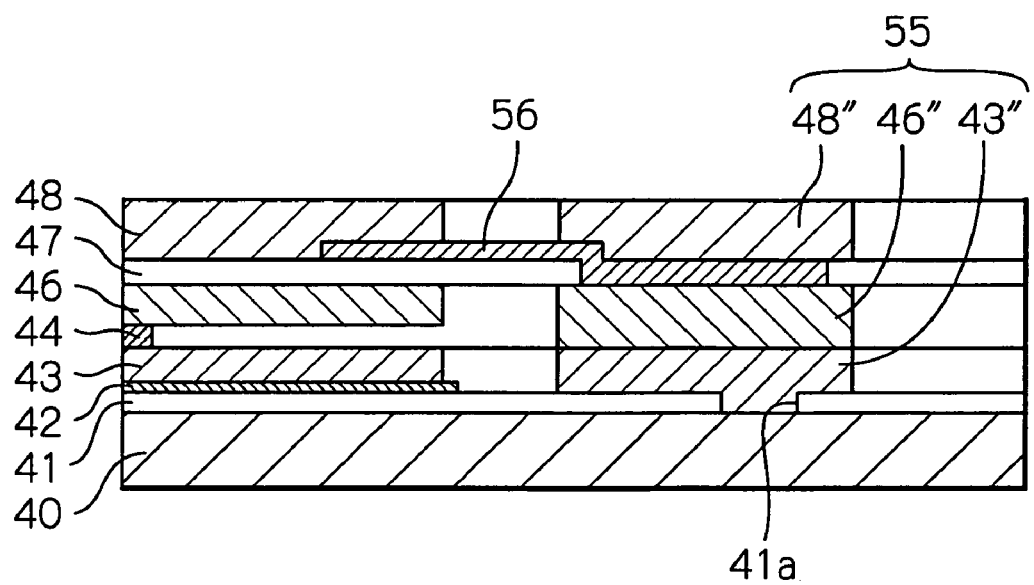
FIG. 6 is an off-center sectional view illustrating a configuration of a lead conductor for electrically connecting a heatsink and a lower pole layer.

The heatsink 55 and the lower magnetic pole layer 48 are electrically connected to each other by a strip-shaped thin lead conductor 56. Because it is not located along the central section line, this conductor 56 is not shown in FIG. 4. However, in FIG. 6 that is an off-center sectional view, structure of this lead conductor 56 is illustrated.

The lead conductor 56 is made of a conductive material such as for example Cu but has a whole electrical resistance of several ohms because its thickness is thin as 0.1 µm for example and its width is considerably narrow. Whereas the heatsink 55 has a good electrical conductivity because it is made by a magnetic metal material. Thus, it is considered that the substrate 40 and the lower magnetic pole layer 48 are electrically connected by a resistance element with the resistance of several ohms. As will be mentioned later, this electrical resistance is desired to be 100Ω or less.

Figure 7:
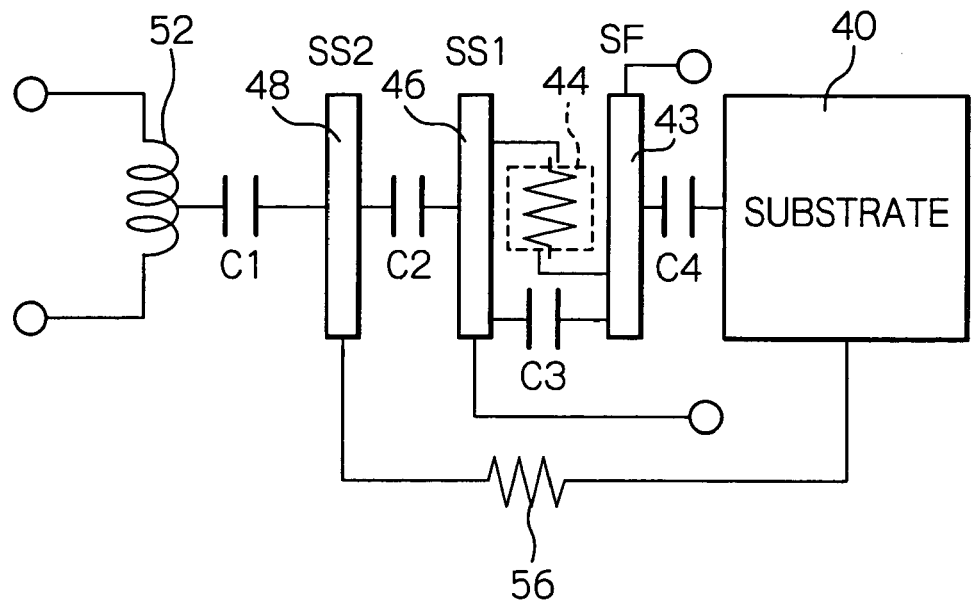
FIG. 7 is a circuit diagram schematically illustrating an equivalent circuit of the composite thin-film magnetic head.
Figure 8:
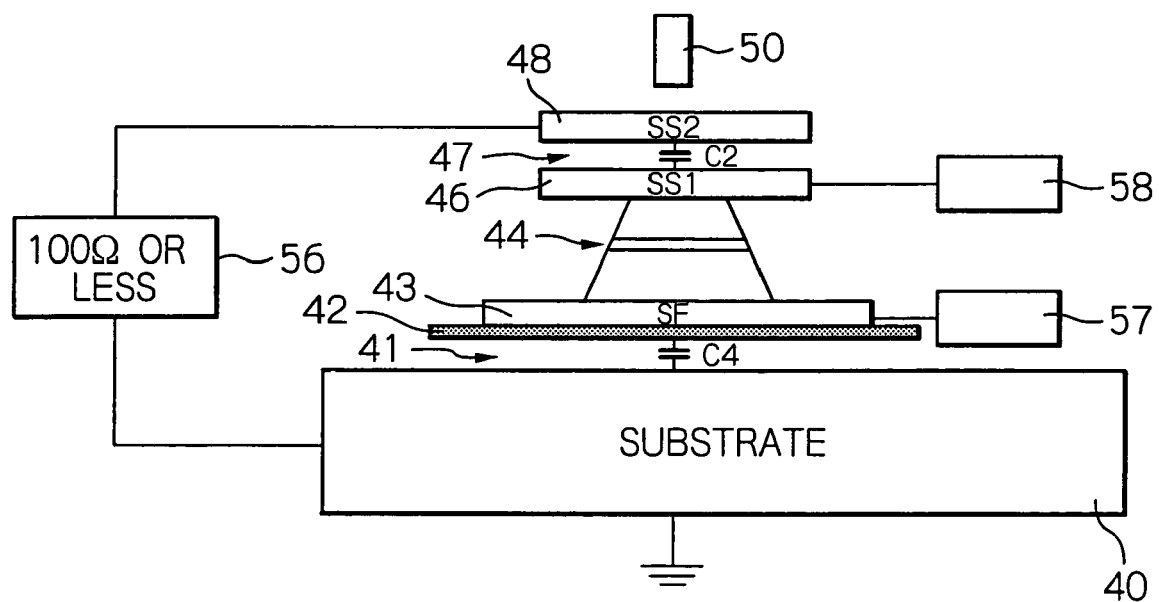
FIG. 8 is a view typically illustrating the configuration of the composite thin-film magnetic head shown in FIG. 4.

FIG. 7 schematically illustrates an equivalent circuit of the composite thin-film magnetic head, and FIG. 8 typically illustrates the configuration of the composite thin-film magnetic head shown in FIG. 4.

As shown in FIG. 7, in the composite thin-film magnetic head provided with the CPP-structure MR read head element, a parasitic capacitance C1 is generated between the write coil 52 and the lower magnetic pole layer (SS2) 48 of the inductive write head element, a parasitic capacitance C2 is generated between the lower magnetic pole layer 48 and the upper shield layer (SS1) 46 of the MR read head element, a parasitic capacitance C3 is generated between the upper shield layer 46 and the lower shield layer (SF) 43, and a parasitic capacitance C4 is generated between the lower shield layer 43 and the substrate 40.

As mentioned before, in order to reduce the crosstalk between the read head element and the write head element and influence of the external noises, it is required that (1) the substrate 40 and the lower magnetic pole layer 48 are kept at the same potential, and (2) the parasitic capacitance C4 is kept substantially equal to the parasitic capacitance C2.

In this embodiment, the requirement (1) is achieved by electrically connecting the substrate 40 and the lower magnetic pole layer 48 through the resistance element with an electrical resistance of 100Ω or less using the lead conductor 56 and the heatsink 55. Also, the requirement (2) is achieved by varying in this embodiment the area of the counter electrode of the nonmagnetic conductive layer 42 opposed to the substrate 40 to adjust the parasitic capacitance C4 until C2=C4 is realized.

As is known, the parasitic capacitances C2 and C4 are obtained from the following formulas:

$$C2 = \in_2 \times S2/t2, \text{ and } C4 = \in_4 \times S4/t4$$

where $\in_2$ is a dielectric constant of the insulating material of the inter-shield insulation layer 47, $\in_4$ is a dielectric constant of the insulating material of the under layer 41, t2 is a thickness of the inter-shield insulation layer 47, t4 is a thickness of the under layer 41, S2 is an area of counter electrodes opposed to each other of the lower magnetic pole layer 48 and the upper shield layer 46, and S4 is an area of counter electrodes opposed to each other of the nonmagnetic conductive layer 42 and the substrate 40.

As shown in FIG. 8, in this embodiment, the counter electrode area S4 is increased by laminating the nonmagnetic conductive layer 42 on the substrate-side surface of the lower shield layer 43 to increase the parasitic capacitance C4 so that C2=C4 is attained. In the figure, reference numerals 57 and 58 denote terminal electrodes electrically connected via lead conductors (not shown) to the lower shield layer 43 and the upper shield layer 46 that also operate as a lower electrode and an upper electrode of the CPP-structure MR read head element, respectively.

In order to keep good thermal dissipation efficiency for suppressing the thermal expansion of the magnetic pole layers due to produced heat during the write operations, it is impossible to increase the thicknesses of the under layer 41 and the inter-shield insulation layer 47 from predetermined necessary values. Rather, in order to decrease the manufacturing time so as to achieve the economics of mass production, it is desired to form these layers thinner as much as possible. Contrary to this, in order to prevent electrical breakdown due to charging up, these layers should not be formed too thin. Since the under layer 41 is laminated on the substrate 40 with a poor surface flatness, if formed by $Al_2O_3$ to satisfy a good insulating performance, a thickness of 0.3 μm or more should be required at least for the under layer 41. Therefore, it is quite difficult to adjust the parasitic capacitances C4 and/or C2 by controlling the thickness of the under layer 41.

With respect to the inter-shield insulation layer 47, since it is formed on a layer with an improved good surface flatness due to the CMP, its thickness can be reduced less than 0.3 μm. However, if the thickness is reduced, the parasitic capacitance C2 will be increased.

Although insulation materials with different dielectric constants ∈4 and ∈2 can be used as for the under layer 41 and the inter-shield insulation layer 47, respectively, it is desired to use the same insulation material for these layers to obtain the economics of mass production.

The counter electrode area can be adjusted by changing the shape and size of the lower shield layer (SF) 43, the upper shield layer (SS1) 46 and/or the lower magnetic pole layer (SS2) 48 themselves. However, because they exert a large influence upon the resistance against external magnetic field, upon the shield magnetic domain performance due to write stress, and upon the reading/writing characteristics, it is quite difficult to freely change these shape and size so as to adjust the parasitic capacitances C4 and/or C2.

According to this embodiment, the nonmagnetic conductive layer 42 conducted to the lower shield layer 43 is added to counter with the substrate 40 so as to increase the substantial counter electrode area between the lower shield layer 43 and the substrate 40 and then to increase the parasitic capacitance C4. Therefore, it is possible to easily adjust the parasitic capacitance C4 so as to be equal to the parasitic capacitance C2. Because the added conductive layer 42 is nonmagnetic and also no change in the thickness, shape and size of the of the lower shield layer (SF) 43, the upper shield layer (SS1) 46 and the lower magnetic pole layer (SS2) 48 is necessary, the external magnetic field resistance, the shield magnetic domain performance due to write stress and the reading/writing characteristics of the thin-film magnetic head are never changed.

In this embodiment, also, because the nonmagnetic conductive layer 42 is laminated on the substrate-side surface of the lower shield layer 43, a distance between the nonmagnetic conductive layer 42 and the substrate 40 is not increased to effectively increase the parasitic capacitance C4. If the parasitic capacitance C4 is increased, it is possible to increase the parasitic capacitance C2 and therefore to make the inter-shield insulation layer 47 thinner.

According to this embodiment, further, the substrate 40 and the lower magnetic pole layer 48 becomes at substantially the same potential by electrically connecting them using the resistance element with an electrical resistance of 100Ω or less, and the potential difference between the lower shield layer 43 and the upper shield layer 46 that operate the lower electrode and the upper electrode of the CPP-structure MR read head element becomes substantially zero by adjusting the parasitic capacitance so that C4=C2. As a result, any external noise entered into the thin-film magnetic head is never presented on the reproduced signal to prevent error due to the external noises from occurring, and thus reliability of the head is improved.

Figure 9:
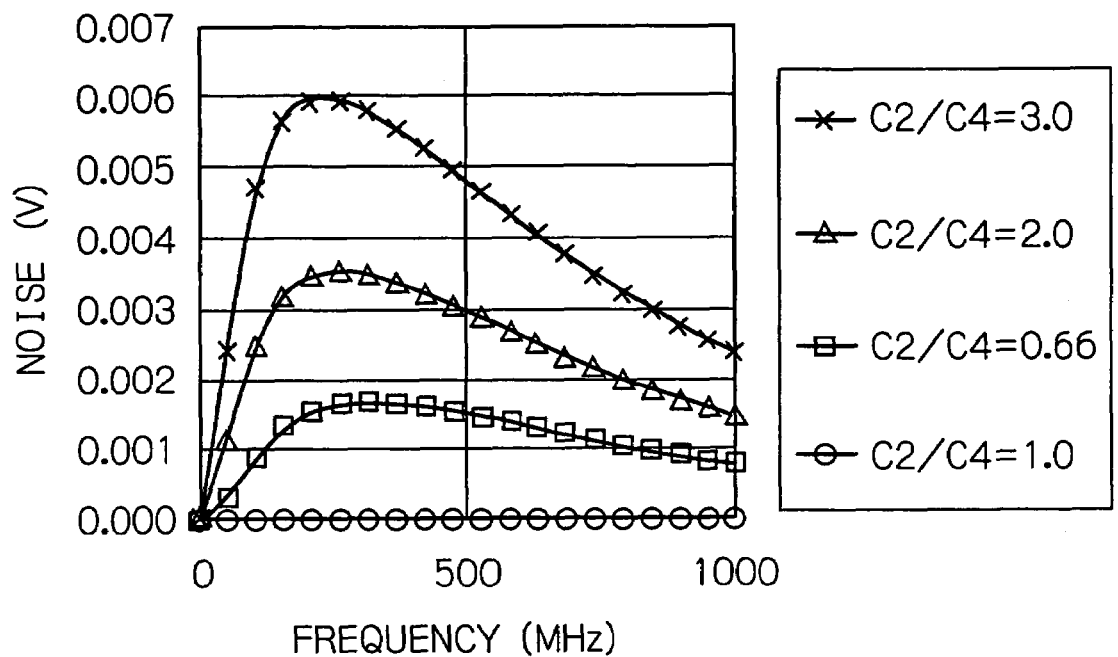
FIG. 9 is a graph illustrating characteristics of external noises (V) contained in reproduced signals with respect to a frequency (MHz) of the reproduced signal when a ratio of parasitic capacitances C2/C4 is considered as a parameter.

FIG. 9 illustrates characteristics of external noises (V) contained in reproduced signals with respect to a frequency (MHz) of the reproduced signal when a ratio of the parasitic capacitances C2/C4 is considered as a parameter.

As will be apparent from the figure, noise hardly occurs when C2/C4=1.

Figure 10:
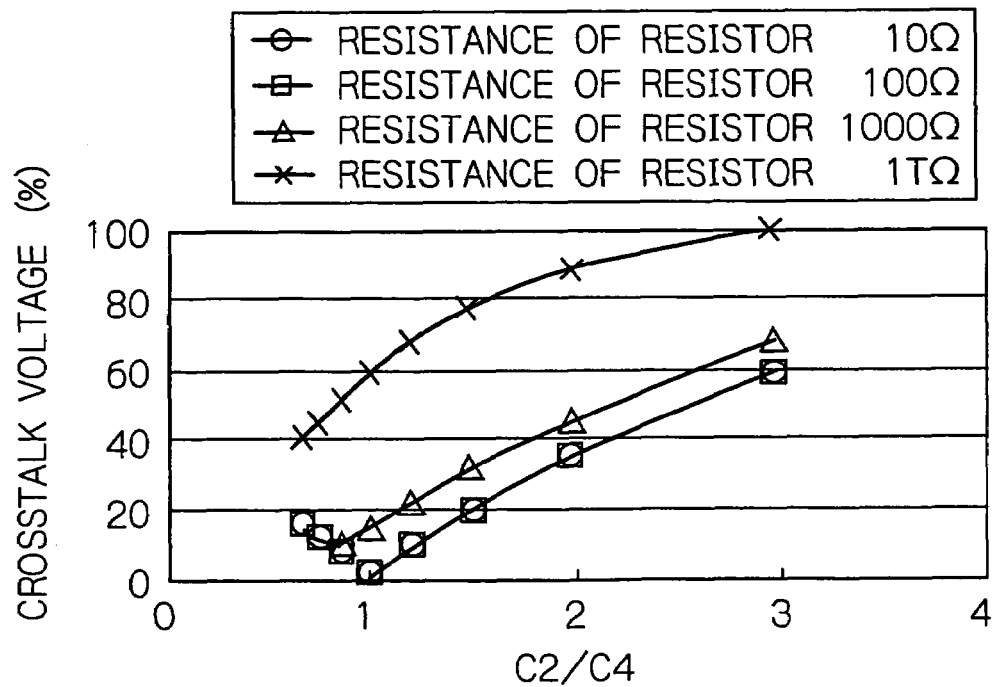
FIG. 10 is a graph illustrating characteristics of crosstalk voltage (%) with respect to a ratio of parasitic capacitances C2/C4 when an electrical resistance of a resistance element connected between a substrate and a lower magnetic pole layer is considered as a parameter.

FIG. 10 illustrates characteristics of crosstalk voltage (%) with respect to a ratio of the parasitic capacitances C2/C4 when an electrical resistance of the resistance element connected between the substrate 40 and the lower magnetic pole layer 48 is considered as a parameter.

As will be also apparent from this figure, no crosstalk occurs when the resistance of the resistance element is 100Ω or less and C2/C4=1.

According to the present invention, in case of the TMR read head element, a reduction of the crosstalk voltage directly applied from the write head element to the read head element can certainly prevent formation of pinholes in the barrier layer, which reduce the element resistance and deteriorate the reading characteristics. In case of the CPP-structure GMR read head element, a reduction of the crosstalk voltage directly applied from the write head element to the read head element can prevent a decrease in operating life of the read head element due to an enhancement of electromigration and can also prevent a degradation of magnetic properties due to an enhancement of an interlayer diffusion of metal atoms.

As for one modification of this embodiment, the nonmagnetic conductive layer 42 may be laminated on a surface of the lower shield layer 43, opposite to the substrate-side surface. When the parasitic capacitance C2 is increased due to the thinned inter-shield insulation layer 47 for example and thus it is necessary to increase the parasitic capacitance C4 so as to attain C2=C4, this modification can easily increase the parasitic capacitance C4.

As for another modification of this embodiment, the nonmagnetic conductive layer 42 may be formed to counter the substrate 40 and to electrically connect to the lower shield layer 43 without laminating on the lower shield layer 43.

Figure 11:
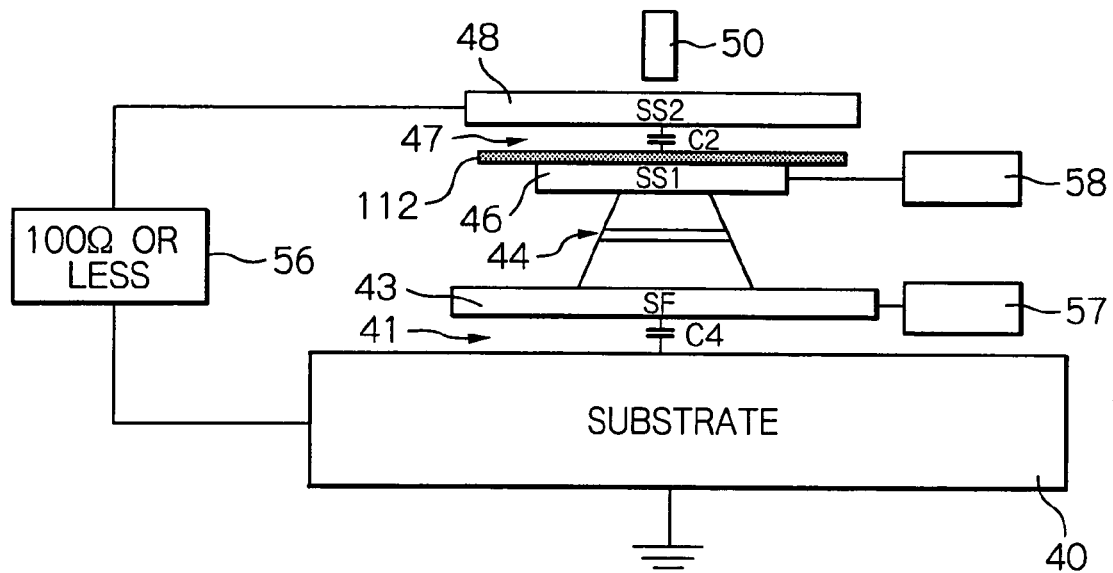
FIG. 11 is a view typically illustrating a configuration of a composite thin-film magnetic head in another embodiment according to the present invention.

FIG. 11 typically illustrates a configuration of a composite thin-film magnetic head in another embodiment according to the present invention.

In this embodiment, a nonmagnetic conductive layer 112 is additionally laminated on a lower pole layer side surface of the upper shield layer (SS1) 46. This nonmagnetic conductive layer 112 and the upper shield layer 46 are electrically conducted to each other. Another configuration in this embodiment is the same as these in the embodiment shown in FIGS. 1-10 and therefore description of the layer configuration is omitted. Also, in FIG. 11, the same components as those in FIG. 8 use the same reference numerals.

By varying in this embodiment the area of the counter electrode of the nonmagnetic conductive layer 112 opposed to the lower magnetic pole layer 48 to adjust the parasitic capacitance C2 until C2=C4 is realized. More concretely, in this embodiment, the counter electrode area S2 is increased by laminating the nonmagnetic conductive layer 112 on the lower pole layer side surface of the upper shield layer 46 to increase the parasitic capacitance C2 so that C2=C4 is attained. In the figure, reference numerals 57 and 58 denote terminal electrodes electrically connected via lead conductors (not shown) to the lower shield layer 43 and the upper shield layer 46 that also operate as a lower electrode and an upper electrode of the CPP-structure MR read head element, respectively.

In order to keep good thermal dissipation efficiency for suppressing the thermal expansion of the magnetic pole layers due to produced heat during the write operations, it is impossible to increase the thicknesses of the under layer 41 and the inter-shield insulation layer 47 from predetermined necessary values. Rather, in order to decrease the manufacturing time so as to achieve the economics of mass production, it is desired to form these layers thinner as much as possible. Contrary to this, in order to prevent electrical breakdown due to charging up, these layers should not be formed too thin. Since the under layer 41 is laminated on the substrate 40 with a poor surface flatness, if formed by $Al_2O_3$ to satisfy a good insulating performance, a thickness of 0.3 μm or more should be required at least for the under layer 41. Therefore, it is quite difficult to adjust the parasitic capacitances C4 and/or C2 by controlling the thickness of the under layer 41.

With respect to the inter-shield insulation layer 47, since it is formed on a layer with an improved good surface flatness due to the CMP, its thickness can be reduced less than 0.3 μm to increase the parasitic capacitance C2. If it is necessary to increase the parasitic capacitance C2 more, addition of this nonmagnetic conductive layer 112 is very effective.

Although insulation materials with different dielectric constants $\in 4$ and $\in 2$ can be used as for the under layer 41 and the inter-shield insulation layer 47, respectively, it is desired to use the same insulation material for these layers to obtain the economics of mass production.

The counter electrode area can be adjusted by changing the shape and size of the lower shield layer (SF) 43, the upper shield layer (SS1) 46 and/or the lower magnetic pole layer (SS2) 48 themselves. However, because they exert a large influence upon the resistance against external magnetic field, upon the shield magnetic domain performance due to write stress, and upon the reading/writing characteristics, it is quite difficult to freely change these shape and size so as to adjust the parasitic capacitances C4 and/or C2.

According to this embodiment, the nonmagnetic conductive layer 112 conducted to the upper shield layer 46 is added to counter with the lower magnetic pole layer 48 so as to increase the substantial counter electrode area between the upper shield layer 46 and the lower magnetic pole layer 48 and then to increase the parasitic capacitance C2. Therefore, it is possible to easily adjust the parasitic capacitance C2 so as to be equal to the parasitic capacitance C4. Because the added conductive layer 112 is nonmagnetic and also no change in the thickness, shape and size of the of the lower shield layer (SF) 43, the upper shield layer (SS1) 46 and the lower magnetic pole layer (SS2) 48 is necessary, the external magnetic field resistance, the shield magnetic domain performance due to write stress and the reading/writing characteristics of the thin-film magnetic head are never changed.

In this embodiment, also, because the nonmagnetic conductive layer 112 is laminated on the lower pole side surface of the upper shield layer 46, a distance between the nonmagnetic conductive layer 112 and the lower magnetic pole layer 48 is not increased to effectively increase the parasitic capacitance C2.

According to this embodiment, further, the substrate 40 and the lower magnetic pole layer 48 becomes at substantially the same potential by electrically connecting them using the resistance element with an electrical resistance of 100Ω or less, and the potential difference between the lower shield layer 43 and the upper shield layer 46 that operate the lower electrode and the upper electrode of the CPP-structure MR read head element becomes substantially zero by adjusting the parasitic capacitance so that C4=C2. As a result, any external noise entered into the thin-film magnetic head is never presented on the reproduced signal to prevent error due to the external noises from occurring, and thus reliability of the head is improved.

As for one modification of this embodiment, the nonmagnetic conductive layer 112 may be laminated on a surface of the upper shield layer 46, opposite to the lower pole layer side surface. When the parasitic capacitances C2 and C4 is C2 <C4 and it is impossible to thin the inter-shield insulation layer 47, it is necessary to increase the parasitic capacitance C2 so as to attain C2=C4. In such case, this modification can easily increase the parasitic capacitance C2 to adjust as C2=C4.

As for another modification of this embodiment, the nonmagnetic conductive layer 112 may be formed to counter the lower magnetic pole layer 48 and to electrically connect to the upper shield layer 46 without laminating on the upper shield layer 46.

Figure 12:
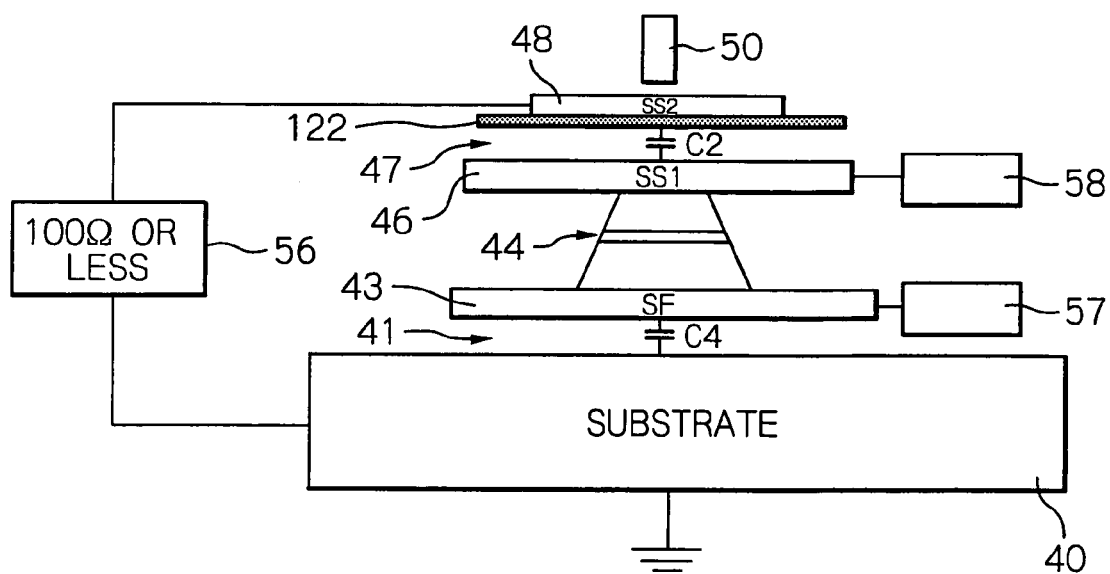
FIG. 12 is a view typically illustrating a configuration of a composite thin-film magnetic head in further embodiment according to the present invention.

FIG. 12 typically illustrates a configuration of a composite thin-film magnetic head in further embodiment according to the present invention.

In this embodiment, a nonmagnetic conductive layer 122 is additionally laminated on an upper shield layer side surface of the lower magnetic pole layer (SS2) 48. This nonmagnetic conductive layer 122 and the lower magnetic pole layer 48 are electrically conducted to each other. Another configuration in this embodiment is the same as these in the embodiment shown in FIGS. 1-10 and therefore description of the layer configuration is omitted. Also, in FIG. 11, the same components as those in FIG. 8 use the same reference numerals.

By varying in this embodiment the area of the counter electrode of the nonmagnetic conductive layer 122 opposed to the upper shield layer 46 to adjust the parasitic capacitance C2 until C2=C4 is realized. More concretely, in this embodiment, the counter electrode area S2 is increased by laminating the nonmagnetic conductive layer 122 on the upper shield layer side surface of the lower magnetic pole layer 48 to increase the parasitic capacitance C2 so that C2=C4 is attained. In the figure, reference numerals 57 and 58 denote terminal electrodes electrically connected via lead conductors (not shown) to the lower shield layer 43 and the upper shield layer 46 that also operate as a lower electrode and an upper electrode of the CPP-structure MR read head element, respectively.

In order to keep good thermal dissipation efficiency for suppressing the thermal expansion of the magnetic pole layers due to produced heat during the write operations, it is impossible to increase the thicknesses of the under layer 41 and the inter-shield insulation layer 47 from predetermined necessary values. Rather, in order to decrease the manufacturing time so as to achieve the economics of mass production, it is desired to form these layers thinner as much as possible. Contrary to this, in order to prevent electrical breakdown due to charging up, these layers should not be formed too thin. Since the under layer 41 is laminated on the substrate 40 with a poor surface flatness, if formed by $Al_2O_3$ to satisfy a good insulating performance, a thickness of 0.3 μm or more should be required at least for the under layer 41. Therefore, it is quite difficult to adjust the parasitic capacitances C4 and/or C2 by controlling the thickness of the under layer 41.

With respect to the inter-shield insulation layer 47, since it is formed on a layer with an improved good surface flatness due to the CMP, its thickness can be reduced less than 0.3 μm to increase the parasitic capacitance C2. If it is necessary to increase the parasitic capacitance C2 more, addition of this nonmagnetic conductive layer 122 is very effective.

Although insulation materials with different dielectric constants ∈4 and ∈2 can be used as for the under layer 41 and the inter-shield insulation layer 47, respectively, it is desired to use the same insulation material for these layers to obtain the economics of mass production.

The counter electrode area can be adjusted by changing the shape and size of the lower shield layer (SF) 43, the upper shield layer (SS1) 46 and/or the lower magnetic pole layer (SS2) 48 themselves. However, because they exert a large influence upon the resistance against external magnetic field, upon the shield magnetic domain performance due to write stress, and upon the reading/writing characteristics, it is quite difficult to freely change these shape and size so as to adjust the parasitic capacitances C4 and/or C2.

According to this embodiment, the nonmagnetic conductive layer 122 conducted to the lower magnetic pole layer 48 is added to counter with the upper shield layer 46 so as to increase the substantial counter electrode area between the lower magnetic pole layer 48 and the upper shield layer 46 and then to increase the parasitic capacitance C2. Therefore, it is possible to easily adjust the parasitic capacitance C2 so as to be equal to the parasitic capacitance C4. Because the added conductive layer 122 is nonmagnetic and also no change in the thickness, shape and size of the of the lower shield layer (SF) 43, the upper shield layer (SS1) 46 and the lower magnetic pole layer (SS2) 48 is necessary, the external magnetic field resistance, the shield magnetic domain performance due to write stress and the reading/writing characteristics of the thin-film magnetic head are never changed.

In this embodiment, also, because the nonmagnetic conductive layer 122 is laminated on the upper shield layer side surface of the lower magnetic pole layer 48, a distance between the nonmagnetic conductive layer 122 and the upper shield layer 46 is not increased to effectively increase the parasitic capacitance C2.

According to this embodiment, further, the substrate 40 and the lower magnetic pole layer 48 becomes at substantially the same potential by electrically connecting them using the resistance element with an electrical resistance of 100Ω or less, and the potential difference between the lower shield layer 43 and the upper shield layer 46 that operate the lower electrode and the upper electrode of the CPP-structure MR read head element becomes substantially zero by adjusting the parasitic capacitance so that C4=C2. As a result, any external noise entered into the thin-film magnetic head is never presented on the reproduced signal to prevent error due to the external noises from occurring, and thus reliability of the head is improved.

As for one modification of this embodiment, the nonmagnetic conductive layer 122 may be laminated on a surface of the lower magnetic pole layer 48, opposite to the upper shield layer side surface. When the parasitic capacitances C2 and C4 is C2<C4 and it is impossible to thin the inter-shield insulation layer 47, it is necessary to increase the parasitic capacitance C2 so as to attain C2=C4. In such case, this modification can easily increase the parasitic capacitance C2 to adjust as C2=C4.

As for another modification of this embodiment, the nonmagnetic conductive layer 122 may be formed to counter the upper shield layer 46 and to electrically connect to the lower magnetic pole layer 48 without laminating on the lower magnetic pole layer 48.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A composite thin-film magnetic head comprising:
   a substrate;
   a first insulation layer laminated on said substrate;
   a magnetoresistive effect read head element formed on said first insulation layer and provided with a lower shield layer, an upper shield layer and a magnetoresistive effect layer in which a sense current flows in a direction perpendicular to a surface of said magnetoresistive effect layer through said upper shield layer and said lower shield layer;
   a second insulation layer laminated on said magnetoresistive effect read head element;
   an inductive write head element formed on said second insulation layer and provided with a lower magnetic pole layer, a recording gap layer, an upper magnetic pole layer whose end portion is opposed to an end portion of said lower magnetic pole layer through said recording gap layer and a write coil; and
   a nonmagnetic conductive layer electrically connected with said lower shield layer and formed between said lower shield layer and said substrate in order to increase substantially a counter electrode area formed between said lower shield layer and said substrate,
   wherein a parasitic capacitance generated between said substrate and said lower shield layer is substantially equal to a parasitic capacitance generated between said upper shield layer and said lower magnetic pole layer.

2. The composite thin-film magnetic head as claimed in claim 1, wherein said nonmagnetic conductive layer is laminated on a substrate-side surface of said lower shield layer.

3. The composite thin-film magnetic head as claimed in claim 1, wherein a thickness of said second insulation layer is thinner than that of said first insulation layer.

4. The composite thin-film magnetic head as claimed in claim 1, wherein an electrical resistance between said substrate and said lower magnetic pole layer is 100Ω or less.

5. The composite thin-film magnetic head as claimed in claim 1, wherein said magnetoresistive effect read head element is a giant magnetoresistive effect read head element.

6. The composite thin-film magnetic head as claimed in claim 1, wherein said magnetoresistive effect read head element is a tunnel magnetoresistive effect read head element.

7. A magnetic head assembly including a composite thin-film magnetic head and a support member for supporting said composite thin-film magnetic head, said composite thin-film magnetic head comprising:
   a substrate;
   a first insulation layer laminated on said substrate;
   a magnetoresistive effect read head element formed on said first insulation layer and provided with a lower shield layer, an upper shield layer and a magnetoresistive effect layer in which a sense current flows in a direction perpendicular to a surface of said magnetoresistive effect layer though said upper shield layer and said lower shield layer;
   a second insulation layer laminated on said magnetoresistive effect read head element;
   an inductive write head element formed on said second insulation layer and provided with a lower magnetic pole layer, a recording gap layer, an upper magnetic pole layer whose end portion is opposed to an end portion of said lower magnetic pole layer through said recording gap layer and a write coil; and a nonmagnetic conductive layer electrically connected with said lower shield layer and formed between said lower shield layer and said substrate in order to increase substantially a counter electrode area formed between said lower shield layer and said substrate, wherein a parasitic capacitance generated between said substrate and said lower shield layer is substantially equal to a parasitic capacitance generated between said upper shield layer and said lower magnetic pole layer.

8. The magnetic head assembly as claimed in claim 7, wherein an electrical resistance between said substrate and said lower magnetic pole layer is 100Ω or less.

9. A magnetic disk drive apparatus including at least one magnetic disk, at least one composite thin-film magnetic head and at least one support member for supporting said at least one composite thin-film magnetic head, each composite thin-film magnetic head comprising:

a substrate;

a first insulation layer laminated on said substrate;

a magnetoresistive effect read head element formed on said first insulation layer and provided with a lower shield layer, an upper shield layer and a magnetoresistive effect layer in which a sense current flows in a direction perpendicular to a surface of said magnetoresistive effect layer through said upper shield layer and said lower shield layer;

a second insulation layer laminated on said magnetoresistive effect read head element;

an inductive write head element formed on said second insulation layer and provided with a lower magnetic pole layer, a recording gap layer, an upper magnetic pole layer whose end portion is opposed to an end portion of said lower magnetic pole layer through said recording gap layer and a write coil; and a nonmagnetic conductive layer electrically connected with said lower shield layer and formed between said lower shield layer and said substrate in order to increase substantially a counter electrode area formed between said lower shield layer and said substrate, wherein a parasitic capacitance generated between said substrate and said lower shield layer is substantially equal to a parasitic capacitance generated between said upper shield layer and said lower magnetic pole layer.

10. The magnetic disk drive apparatus as claimed in claim 9, wherein an electrical resistance between said substrate and said lower magnetic pole layer is 100Ω or less.

* * * * *